(12) United States Patent
Mullin

(10) Patent No.: US 9,559,623 B2
(45) Date of Patent: Jan. 31, 2017

(54) METHOD OF CONTROLLING AN ELECTRICAL MACHINE

(71) Applicant: Regal Beloit America, Inc., Beloit, WI (US)

(72) Inventor: Paul S. Mullin, Yellow Springs, OH (US)

(73) Assignee: Regal Beloit America, Inc., Beloit, WI (US)

( * ) Notice: Subject to any disclaimer, the term of this patent is extended or adjusted under 35 U.S.C. 154(b) by 297 days.

(21) Appl. No.: 14/014,710

(22) Filed: Aug. 30, 2013

(65) Prior Publication Data

US 2015/0061556 A1    Mar. 5, 2015

(51) Int. Cl.
*H02P 6/04* (2016.01)
*H02P 6/20* (2016.01)
*H02P 6/18* (2016.01)

(52) U.S. Cl.
CPC .............. *H02P 6/20* (2013.01); *H02P 6/181* (2013.01)

(58) Field of Classification Search
CPC ............. H02P 6/182; H02P 6/20; H02P 6/205; H02P 25/026; H02P 6/18; H02P 6/22; H02P 1/52; H02P 1/04; H02P 1/46; H02P 21/0053; H02P 27/047
USPC .............. 318/400.01, 400.09, 400.11, 400.2, 318/400.34, 445, 459, 461
See application file for complete search history.

(56) References Cited

U.S. PATENT DOCUMENTS

| 3,382,384 | A | * | 5/1968 | Hulls ............................ 310/93 |
| 3,636,429 | A |   | 1/1972 | Jakubowski et al. |
| 3,663,880 | A |   | 5/1972 | Gabor |
| 3,838,325 | A | * | 9/1974 | Kobayashi et al. .......... 388/844 |
| 4,286,202 | A |   | 8/1981 | Clancy et al. |
| 4,565,957 | A | * | 1/1986 | Gary et al. .................... 318/723 |

(Continued)

FOREIGN PATENT DOCUMENTS

| WO | 2005043713 | 5/2005 |
| WO | 2012149237 | 11/2012 |

OTHER PUBLICATIONS

United States Patent Office Action for U.S. Appl. No. 13/096,537 dated Jan. 14, 2014 (9 pages).

(Continued)

*Primary Examiner* — Bentsu Ro
*Assistant Examiner* — Thai Dinh
(74) *Attorney, Agent, or Firm* — Michael Best & Friedrich LLP

(57) ABSTRACT

A method of controlling an electrical machine. The electrical machine includes a stator having a core and a plurality of windings, and a rotor disposed adjacent to the stator to interact with the stator. The method includes configuring an amplitude value and frequency values of a three-phase alternating current (AC) voltage startup signal having an amplitude and a frequency, providing the three-phase alternating current (AC) voltage startup signal to the plurality of windings, and altering the frequency of the three-phase AC voltage startup signal according to a preprogrammed frequency ramp function defined by the frequency values. The method further includes discontinuing the three-phase AC voltage startup signal after the frequency ramp function has completed, and switching to a back electromotive force (BEMF) control mode after discontinuing the three-phase AC voltage startup signal.

23 Claims, 9 Drawing Sheets

(56) References Cited

U.S. PATENT DOCUMENTS

| | | | |
|---|---|---|---|
| 4,641,066 A * | 2/1987 | Nagata | H02P 6/20 |
| | | | 318/400.11 |
| 4,673,849 A | 6/1987 | Sears et al. | |
| 4,743,815 A * | 5/1988 | Gee et al. | 318/400.11 |
| 4,896,089 A | 1/1990 | Kliman et al. | |
| 5,001,405 A | 3/1991 | Cassat | |
| 5,003,241 A | 3/1991 | Rowan et al. | |
| 5,012,166 A | 4/1991 | Ushijima et al. | |
| 5,198,733 A | 3/1993 | Wright | |
| 5,223,771 A | 6/1993 | Chari | |
| 5,235,264 A | 8/1993 | Kaneda et al. | |
| 5,298,838 A | 3/1994 | Peters et al. | |
| 5,343,127 A | 8/1994 | Maiocchi | |
| 5,350,984 A | 9/1994 | Carobolante et al. | |
| 5,397,972 A | 3/1995 | Maiocchi | |
| 5,466,999 A | 11/1995 | Hutsell | |
| 5,537,020 A | 7/1996 | Couture et al. | |
| 5,572,097 A | 11/1996 | Cameron | |
| 5,623,379 A | 4/1997 | Nishimura et al. | |
| 5,672,944 A | 9/1997 | Gokhale et al. | |
| 5,712,539 A | 1/1998 | Zweighaft et al. | |
| 5,777,449 A | 7/1998 | Schlager | |
| 5,796,227 A | 8/1998 | Sears et al. | |
| 5,834,911 A * | 11/1998 | Kimura | 318/400.11 |
| 5,847,535 A | 12/1998 | Nordquist et al. | |
| 5,986,419 A | 11/1999 | Archer et al. | |
| 5,998,946 A | 12/1999 | Kim | |
| 6,002,226 A | 12/1999 | Collier-Hallman et al. | |
| 6,014,003 A | 1/2000 | French | |
| 6,034,493 A | 3/2000 | Boyd et al. | |
| 6,091,222 A | 7/2000 | Vertemara et al. | |
| 6,100,656 A | 8/2000 | El-Sadi et al. | |
| 6,107,772 A | 8/2000 | Liu et al. | |
| 6,160,367 A | 12/2000 | Higashi et al. | |
| 6,229,274 B1 | 5/2001 | Vertemara et al. | |
| 6,249,096 B1 | 6/2001 | Shin | |
| 6,249,101 B1 | 6/2001 | Viti et al. | |
| 6,326,752 B1 | 12/2001 | Jensen et al. | |
| 6,342,770 B1 | 1/2002 | Stephan et al. | |
| 6,483,266 B2 | 11/2002 | Miyazaki et al. | |
| 6,512,343 B1 | 1/2003 | Yasohara | |
| 6,534,938 B1 | 3/2003 | Wu et al. | |
| 6,538,403 B2 | 3/2003 | Gorti et al. | |
| 6,541,928 B2 | 4/2003 | Eroglu et al. | |
| 6,563,286 B2 | 5/2003 | Seki et al. | |
| 6,566,830 B2 | 5/2003 | Walters | |
| 6,570,351 B2 | 5/2003 | Miyazaki et al. | |
| 6,570,353 B2 | 5/2003 | Krotsch et al. | |
| 6,639,371 B2 | 10/2003 | Walters et al. | |
| 6,653,811 B2 | 11/2003 | Branecky | |
| 6,724,166 B2 | 4/2004 | Narumi et al. | |
| 6,741,046 B1 | 5/2004 | Krauth et al. | |
| 6,750,627 B2 | 6/2004 | Holdaway | |
| 6,754,151 B2 | 6/2004 | Watt | |
| 6,765,358 B1 | 7/2004 | Noble et al. | |
| 6,774,590 B2 | 8/2004 | Inagawa et al. | |
| 6,803,737 B2 | 10/2004 | Scheidegger et al. | |
| 6,850,022 B2 | 2/2005 | Liu et al. | |
| 6,859,001 B2 | 2/2005 | Kane et al. | |
| 6,900,604 B2 | 5/2005 | Kokami et al. | |
| 6,995,530 B2 | 2/2006 | Biamonte et al. | |
| 7,088,064 B2 | 8/2006 | Brakelmann et al. | |
| 7,095,204 B2 | 8/2006 | Lee et al. | |
| 7,112,936 B2 | 9/2006 | Lee | |
| 7,242,175 B2 | 7/2007 | Shao et al. | |
| 7,256,564 B2 | 8/2007 | MacKay | |
| 7,443,128 B2 | 10/2008 | Bieler et al. | |
| 7,489,097 B2 | 2/2009 | Fu et al. | |
| 7,514,887 B2 | 4/2009 | Mullin et al. | |
| 7,619,385 B2 * | 11/2009 | Suzuki | H02P 21/22 |
| | | | 318/400.02 |
| 7,667,419 B2 * | 2/2010 | Fukamizu | H02P 6/182 |
| | | | 318/400.01 |
| 8,084,970 B2 | 12/2011 | Mullin et al. | |
| 8,587,233 B2 | 11/2013 | Bass et al. | |
| 8,901,867 B2 * | 12/2014 | Mullin | H02P 6/182 |
| | | | 318/400.11 |
| 2001/0030517 A1 | 10/2001 | Batzel | |
| 2002/0033688 A1 | 3/2002 | Viti | |
| 2002/0043954 A1 | 4/2002 | Hallidy | |
| 2002/0050800 A1 | 5/2002 | Miyazaki et al. | |
| 2003/0062860 A1 | 4/2003 | Wu et al. | |
| 2003/0231875 A1 | 12/2003 | Masino | |
| 2005/0110442 A1 | 5/2005 | Trifilo | |
| 2005/0156545 A1 | 7/2005 | Mueller et al. | |
| 2005/0237017 A1 | 10/2005 | Biamonte et al. | |
| 2006/0284581 A1 | 12/2006 | Mullin et al. | |
| 2008/0180048 A1 * | 7/2008 | Mullin et al. | 318/400.26 |
| 2009/0160384 A1 * | 6/2009 | Mullin et al. | 318/400.34 |
| 2010/0148710 A1 | 6/2010 | Lim et al. | |
| 2012/0274249 A1 | 11/2012 | Mullin | |

OTHER PUBLICATIONS

Fairchild Semiconductor Corporation, Application Brief 42020, The SmartStart™ Technique for BLDC Motors, Sep. 1996, Revised Oct. 25, 2000.
United States Patent Office Action for U.S. Appl. No. 11/379,607 dated May 13, 2008 (31 pages).
United States Patent Office Action for U.S. Appl. No. 11/379,607 dated Dec. 2, 2008 (6 pages).
United States Patent Office Action for U.S. Appl. No. 12/398,675 dated Feb. 16, 2011 (8 pages).
United States Patent Office Action for U.S. Appl. No. 12/398,675 dated Aug. 31, 2011 (5 pages).
International Search Report for Application No. PCT/US2004/034938 dated Mar. 31, 2006 (1 page).
Written Opinion for Application No. PCT/US2004/034938 dated Mar. 31, 2006 (3 pages).
International Search Report and Written Opinion for Application No. PCT/US2012/035329 dated Jun. 5, 2013 (10 pages).
Mexican Office Action for Application No. PA/A/2006/004530 dated Apr. 28, 2009 (3 pages).
Mexican Office Action for Application No. PA/A/2006/004530 dated Sep. 30, 2009 (2 pages).
Mexican Office Action for Application No. PA/A/2006/004530 dated Apr. 27, 2010 (4 pages).
Mexican Office Action for Application No. MX/a/2009/009953 dated Sep. 6, 2011 (4 pages).
Canadian Patent Office Action for Application No. 2543413 dated Feb. 1, 2012 (3 pages).
Canadian Patent Office Action for Application No. 2544557 dated Jul. 22, 2013 (10 pages).
European Patent Office Action for Application No. 12718552.8 dated Feb. 5, 2014 (1 page).

* cited by examiner

METHOD OF CONTROLLING AN ELECTRICAL MACHINE

FIELD OF THE INVENTION

The invention relates to an electrical machine and specifically a brushless, permanent magnet electrical machine. In particular, the invention relates to a system including a brushless direct current (BLDC) motor and a method for starting a BLDC motor.

BACKGROUND

BLDC motors (also known as electronically commutated or "ECM" motors) are becoming more prevalent in industries that typically did not use BLDC motors. For example, the need for increased efficiency in the heating and air conditioning market has led to the use of BLDC motors for powering the blower in heating, ventilation, and/or air conditioning systems (referred to herein as HVAC systems). An HVAC system is one example of an air-movement system. Other example air-movement systems include refrigerators, furnaces, heat pumps, blowers for gas-fired appliances (e.g., a gas water heater), etc.

Generally, BLDC motors are synchronous electric motors powered by direct-current ("DC") electricity and have electronic commutation, rather than mechanical commutators and brushes. Further, BLDC motors include a rotor having a plurality of magnetic poles (e.g., a plurality of poles produced with permanent magnets) of alternating polarity disposed on a surface of a rotor core, and a stator that receives electrical power and produces a magnetic field in response thereto. The magnetic field of the stator interacts with a magnetic field of the rotor to cause movement of the rotor.

BLDC motors use a means for determining the position of the rotor in order to commutate the motor. One method of commutating the motor is referred to as "sensorless" motor commutation. Sensorless motor commutation is often performed by sensing the back electromotive force (BEMF) produced by the motor. Typically, the BEMF signal produced in the stator windings is not large enough for sensorless motor commutation until the speed of the rotor reaches about ten percent of the rated motor speed. As a result, a means of starting the motor without using the BEMF signal may be necessary.

One method of starting a three-phase motor is described in U.S. Publication No. 2009/0160384, which is incorporated herein by reference. Typically, to start the BLDC motor, a controller aligns the rotor of the motor to a known position and then accelerates the rotor (e.g., by using the method described in U.S. Pat. No. 8,084,970). Once the rotor reaches a sufficient speed, the rotor is allowed to coast for a short time (e.g., 20-200 ms) while the controller synchronizes the rotor to engage a normal running mode. During this startup process the air-movement system can generate ramp up noise. In particular, the power signal provided to the rotor can generate torsional torque ripple that excites system vibration modes and results in an audible noise for a short period during ramp up.

Improved methods for starting brushless electrical machines and BLDC motors (e.g., the method described in U.S. Publication No. 2012/0274249, which is incorporated herein by reference) avoid ramp up noise during the startup of the motor by generating a three-phase alternating current (AC) voltage signal by all phases of the motor. However, this method still allows the rotor to coast while the controller synchronizes the rotor to engage a normal running mode. Some motors, such as small motors with low inertia, do not coast well. Therefore, there is a need for a further improved method for starting brushless electrical machines and BLDC motors, where the rotor does not need to coast before engaging in normal running mode.

SUMMARY

In one embodiment, the invention provides a method of controlling an electrical machine including a stator having a core and a plurality of windings, and a rotor disposed adjacent to the stator to interact with the stator. The method includes configuring an amplitude value and a frequency values of a three-phase alternating current (AC) voltage startup signal having an amplitude and a frequency, providing the three-phase AC voltage startup signal to the plurality of windings, and altering the frequency of the three-phase AC voltage startup signal according to a frequency ramp function defined by the frequency values. The method further includes discontinuing the three-phase AC voltage startup signal after the frequency ramp function has completed, and switching to a back electromotive force (BEMF) control mode, after discontinuing the three-phase AC voltage startup signal, by using a known estimated position of the rotor based on the frequency ramp function.

In another embodiment, the invention provides an electrical machine including a stator having a core and a plurality of windings, a rotor disposed adjacent to the stator to interact with the stator, a memory, and a controller arranged to start the electrical machine. The controller is configured to receive a preprogrammed amplitude value and a preprogrammed frequency values of a three-phase alternating current (AC) voltage startup signal having an amplitude and a frequency, generate the three-phase AC voltage startup signal to be provided to the plurality of windings, and alter the frequency of the three-phase AC voltage startup signal according to a frequency ramp function defined by the frequency values. The controller is further configured to discontinue the three-phase AC voltage startup signal after the frequency ramp function has completed, and switch to a back electromotive force (BEMF) control mode, using a known estimated position of the rotor based on the frequency ramp function, after the three-phase AC voltage startup signal is discontinued.

In yet another embodiment, the invention provides an air movement system including a system control board and a motor assembly including a stator having a core and a plurality of windings, and a rotor disposed adjacent to the stator to interact with the stator. The air-movement system further includes a drive circuit coupled to the motor assembly and having a controller and a memory, the controller being configured to start the motor assembly and receive a preprogrammed amplitude value and preprogrammed frequency values of a three-phase alternating current (AC) voltage startup signal having an amplitude and a frequency. The controller starts the motor assembly by being further configured to provide the three-phase AC voltage startup signal to the plurality of windings, alter the frequency of the three-phase AC voltage startup signal according to a frequency ramp function defined by the frequency values, discontinue the three-phase AC voltage startup signal after the frequency ramp function has completed, and switch to a back electromotive force (BEMF) control mode, after discontinuing the three-phase AC voltage startup signal, by using a known estimated position of the rotor based on the frequency ramp function.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

Figure 1:
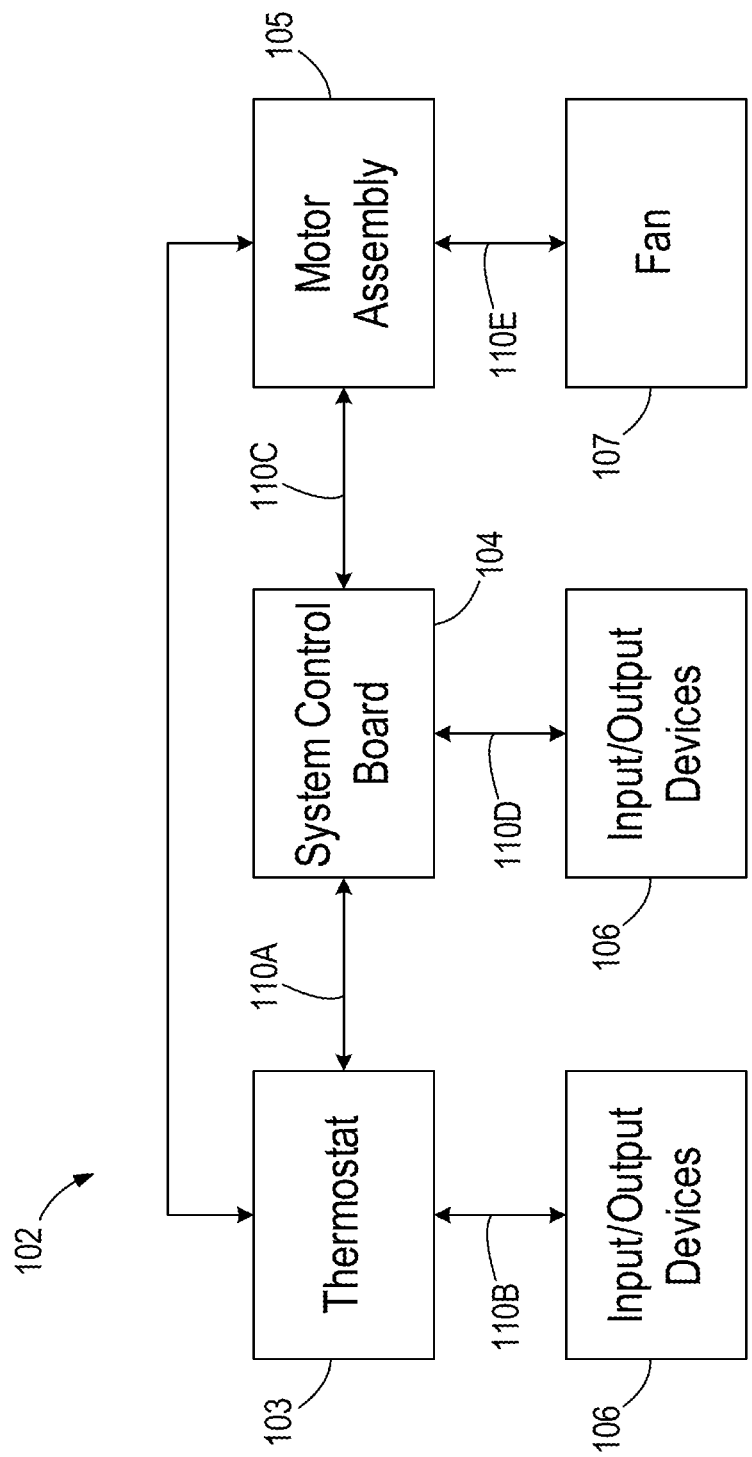
FIG. 1 is a schematic illustration of a refrigeration system including a thermostat, system control board, a motor assembly (e.g., a brushless permanent magnet electrical machine), and a fan.

FIG. 1 illustrates a refrigeration system 102 including a thermostat 103, a system control board 104, a motor assembly 105, input/output devices 106, and a fan 107. The thermostat 103 is coupled to the system control board 104 via a first communication line 110A, and to one or more input/output devices 106 via a second communication line 110B. Additionally or alternatively, the thermostat 103 can be coupled directly to the motor assembly 105. The system control board 104 is coupled to the motor assembly 105 via a third communication line 110C, and to one or more input/output devices 106 via a forth communication line 110D. The motor assembly 105 is coupled to the fan 107 via a fifth communication line 110E. As shown in FIG. 1, the communication lines 110A-110E can represent a two-way system communication between the elements described above. Moreover, communication lines are schematic only, can include analog or digital communication, and can include wire or wireless communication.

In some embodiments, the motor assembly 105 is a small brushless direct current (BLDC) motor that is about 3.3 inches in diameter and is 100 Watts or below. In alternate embodiments, the size and power of the motor assembly 105 can vary. The motor assembly powers the fan 107 to move air in the refrigeration system 102. In some embodiments, the fan 107 is an axial fan. In alternate embodiments, the fan 107 is another type of fan, such as a squirrel cage fan. Although only a single motor assembly 105 and fan 107 is shown in FIG. 1, the refrigeration system 102 may include a plurality of motor assemblies 105 and fans 107, which can move air throughout the refrigeration system 102. Furthermore, in some embodiments, the refrigeration system 102 is a commercial refrigeration system.

Each one of the input/output devices 106 is also a schematic representation of input signals, output signals, and auxiliary devices operating in connection with the thermostat 103, the system control board 104, and the motor assembly 105. Accordingly, more than one implementation of the construction of the refrigeration system 102 is shown in FIG. 1. Moreover, other constructions of the refrigeration system 102 can be possible by utilizing one, or a combination, of the primary devices (e.g. thermostat 103, system control board 104, and motor assembly 105) and a number of input/output devices 106 and/or fans 107. Additionally, it is envisioned that the primary devices discussed further below (e.g., the motor assembly 105) can be used in other applications, either independently or simultaneously with respect to the operation of the refrigeration system 102. For example, in some embodiments, the motor assembly 105 can be used to power a pump. Alternatively, the motor assembly 105 can be used in an HVAC system or ventilation system.

In one construction, the thermostat 103 can include a set of ports used to send output signals generated by the thermostat 103. For example, the output signals generated by the thermostat 103 can include signals indicative of the status of the refrigeration system 102 based on the input signals (e.g. ambient temperature and/or humidity levels) received by the thermostat 103. The thermostat 103 can generate output signals, for example heating (W) and cooling (Y), such that the signals can be interpreted by receiving devices (e.g. the system control board 104) as being "on" or "off." For example, the thermostat can generate a signal W (i.e., a request for heating) through one of the output ports. The signal W can be interpreted by the system control board 104, and as a result, the system control board 104 can generate a signal instructing or causing the motor assembly 105 to operate. In some constructions, the thermostat 103 is configured to generate signals indicative of requests of different levels of heating or cooling.

It is to be understood that the refrigeration system 102 illustrated in FIG. 1 represents only one exemplary construction of an air-movement system, and thus other constructions are possible. Therefore, the operation of the refrigeration system 102 can be implemented in other air-movement systems that include BLDC motors. For example, similar air-movement systems can include ventilation systems, HVAC systems, furnaces, heat pumps, blowers for gas-fired appliances (e.g., a gas water heater), etc.

Further, the refrigeration system 102 (or any other air-movement system) can operate the motor assembly 105 without the input from a thermostat 103. In these constructions, the system control board 104 of the air-movement system 102 can generate a signal instructing the motor assembly 105 to operate based on an input from other external devices or based on a request from an internal module of the system 102. Input from external devices can be limited to a fixed number of operation points to be selected by a user. Alternatively, input from external devices can be limited to a range of operation points where a user can select any speed within the range (e.g., an analog input).

In one construction, the system control board 104 can relay signals generated by the thermostat 103 to the motor assembly 105. More specifically, the system control board 104 processes the signals from the thermostat 103 and generates instructions for operating the motor assembly 105. The system control board 104 can also be operable to communicate with other input/output devices 106, such as humidity control systems, other motors, safety systems, service systems, and combustion blowers. Accordingly, the system control board 104 can generate instructions for the motor assembly 105 based on signals received from the thermostat 103, as well as signals received from alternative devices coupled to the system control board 104, such as safety systems, ambient sensors, and other refrigeration system components.

In some constructions of the refrigeration system 102, the system control board 104 communicates with the motor assembly 105 utilizing at least one serial port. More specifically, the system control board 104 and the motor assembly 105 can be coupled via a serial cable. In some cases, the system control board 104 can generate and send instructions to the motor assembly 105, as well as receive diagnostics from the motor assembly 105 via the same serial port. In other cases, the motor assembly 105 and the system control board 104 can send and receive other information besides instructions and diagnostics utilizing the serial ports based on an operational mode of the system control board 104.

Figure 2:
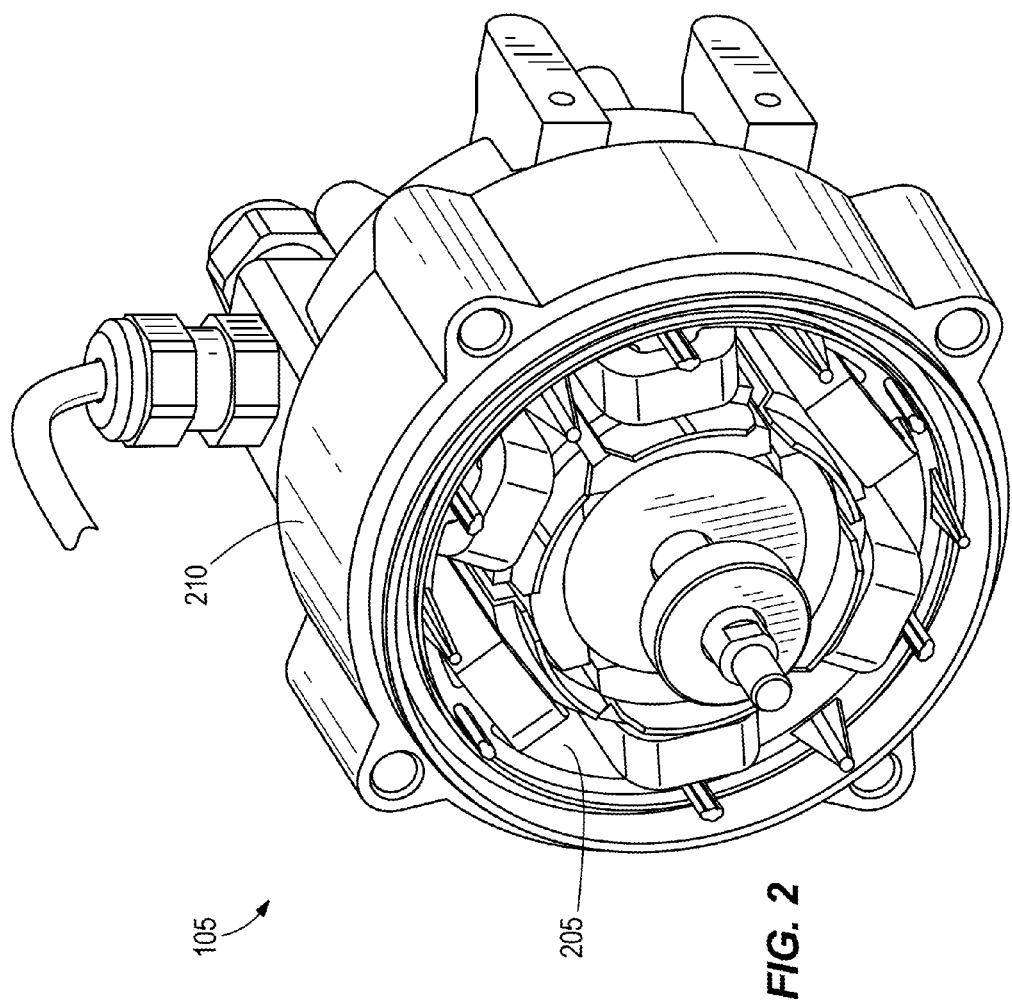
FIG. 2 is a cut-away view of a brushless permanent magnet electrical machine represented by the motor assembly block of FIG. 1.
Figure 3:
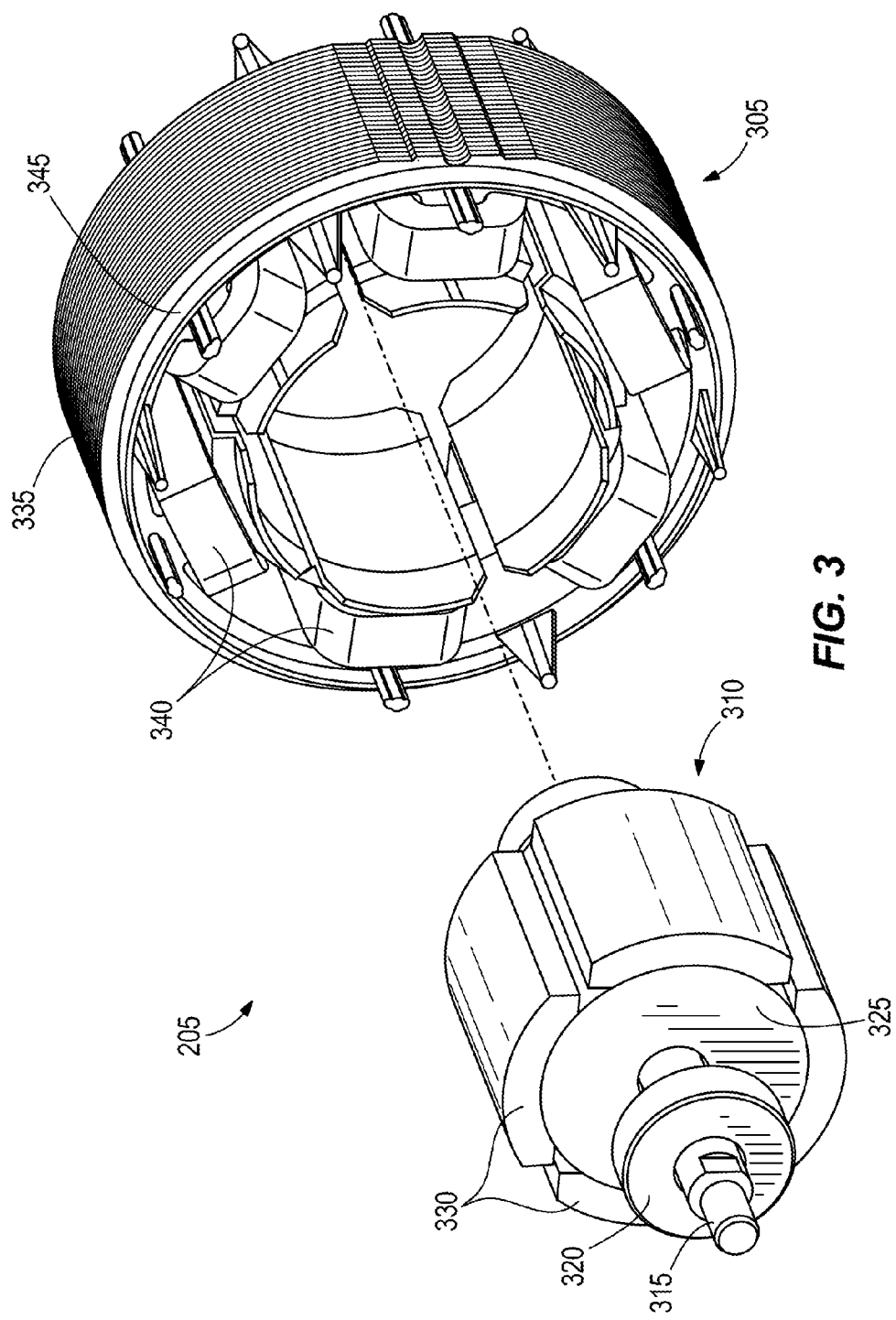
FIG. 3 is a partial exploded view of a stator and a rotor of the brushless permanent magnet electrical machine of FIG. 2.
Figure 4:
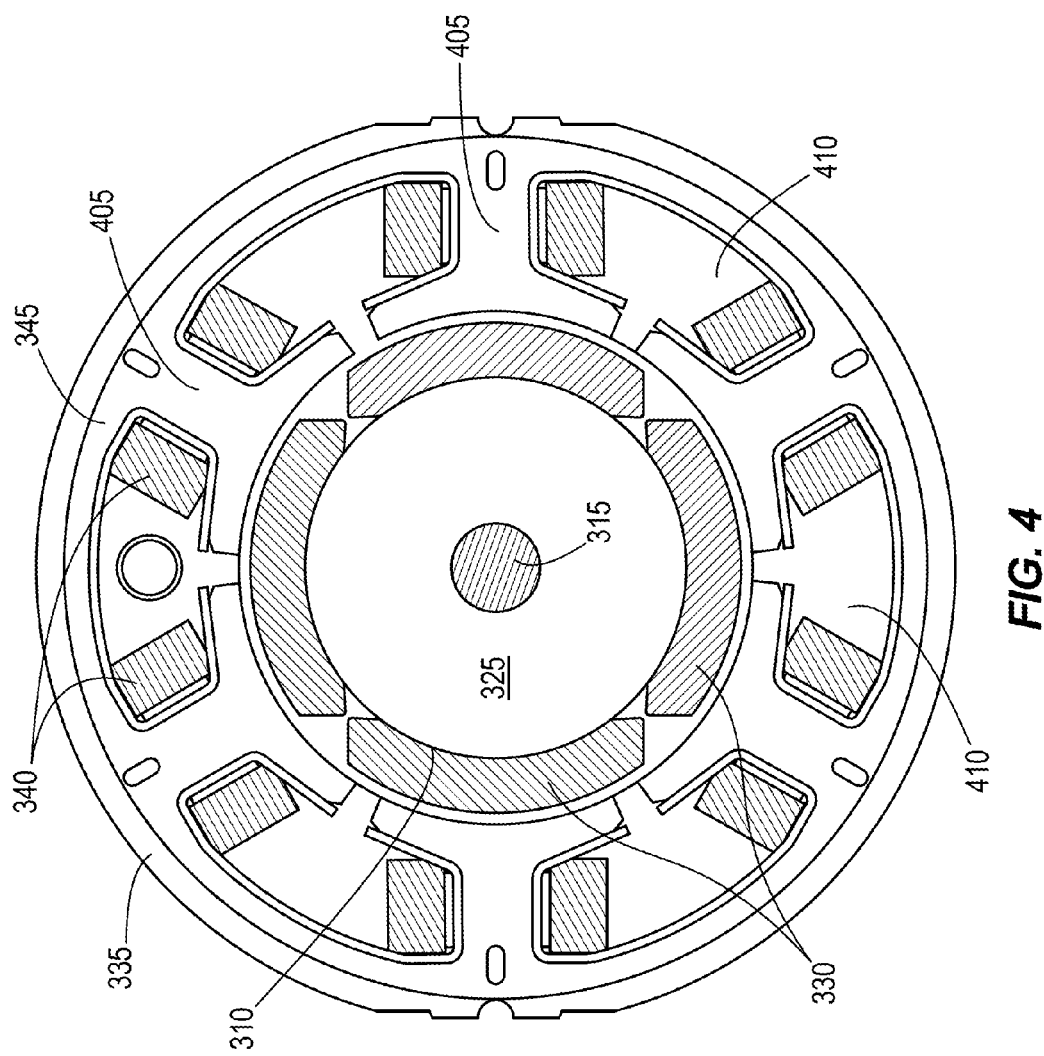
FIG. 4 is a cross-sectional view of the stator and rotor of FIG. 3.

In one construction, the motor assembly 105 includes a permanent magnet BLDC motor. FIGS. 2-4 illustrate portions of an exemplary BLDC motor. However, the invention is not limited to the motor disclosed in FIGS. 2-4. Other BLDC motors or electrically commutated motors (ECMs) can incorporate the invention. Although the BLDC motor is described in relation to an air-movement system (e.g., refrigeration system), it is understood that the described BLDC motor incorporating the invention can be implemented in other systems and used in different industries.

FIG. 2 is a cut-away view of a brushless permanent magnet electrical machine (e.g., motor) according to one construction of the motor assembly 105. For FIG. 2, the electrical machine is a motor 205 having motor housing 210. FIG. 3 is a partial exploded view of the stator 305 and rotor 310 of the motor 205. The rotor 310 is coupled to a shaft 315 and held by one or more bearings 320. In general, the stator 305 receives electrical power, and produces a magnetic field in response thereto. The magnetic field of the stator 305 interacts with a magnetic field of the rotor 310 to produce mechanical power with the shaft 315. The relationship between the magnetic fields of the stator and rotor will be discussed in detail below.

The rotor 310 includes a plurality of magnetic poles of alternating polarity exhibited on a surface of a rotor core 325. The rotor core 325 includes laminations (e.g., magnetic steel laminations), and/or solid material (e.g., a solid magnetic steel core), and/or compressed powdered material (e.g., compressed powder of magnetic steel). One construction of the rotor 310 includes a sheet of permanent magnet (e.g., hard magnetic) material disposed on the rotor core 325. Another construction of the rotor 310 can include a plurality of strips of permanent magnet material attached (e.g., with adhesive) around the core 325. The permanent magnet material can be magnetized by a magnetizer to provide a plurality of alternating magnetic poles. Additionally, the number of magnetic strips can be different than the number of rotor magnetic poles. Yet another construction of the rotor 310 contains blocks of permanent magnet material placed inside the rotor core 325.

In the construction shown in FIG. 3, the rotor 310 is produced by fixing four arc shaped magnets 330 on the rotor core 325. Other rotor designs and constructions are also possible. A magnetizer is used to produce on the rotor 310 a number of alternating magnetic poles that interact with the stator 305.

It is to be understood that the description of the invention is not limited to a particular mechanical construction, geometry, or position of the rotor 310. For example, FIG. 3 shows the rotor 310 located inside and separated by a radial air gap from the stator 305. In another construction of the motor 205, the rotor 310 can be positioned radially exterior to the stator 305 (i.e., the machine is an external- or outer-rotor machine).

The stator 305 includes a stator core 335, stator windings 340, and a back iron portion 345. FIG. 4 is a cross-sectional view of the stator 305 and rotor 310. With reference to FIG. 4, the stator core 335 includes a plurality of stator teeth 405. In one construction, the stator core 335 includes a stack of magnetic steel laminations or sheets. In other constructions, the stator core 335 is formed from a solid block of magnetic material, such as compacted powder of magnetic steel. The stator windings 340 are electrical conductors placed in slots 410 (i.e., the space between adjacent stator teeth 405) and around the plurality of stator teeth 405.

Other constructions and types of the stator core 335 and stator windings 340 known to those skilled in the art can be used and are not limiting on the invention. One method to reduce cogging and ripple torque, which may arise in some BLDC motors, is skewing the magnetization of the magnetic poles with respect to the stator 305. In alternate embodiments, stator teeth 405 can be skewed with respect to the rotor magnetization. In some embodiments, the magnetization of the magnetic poles is not skewed.

In some constructions of the motor 205, electrical current flows through the stator windings 340 and produces a magnetic field that interacts with the magnetization of the rotor 310 to provide torque to the rotor 310 and shaft 315. The electrical current can be an (m) phase alternating current (AC), where (m) is an integer greater than or equal to two. The electrical current can have various types of waveforms (e.g., square wave, quasi-sine wave, trapezoidal, etc).

Figure 5:
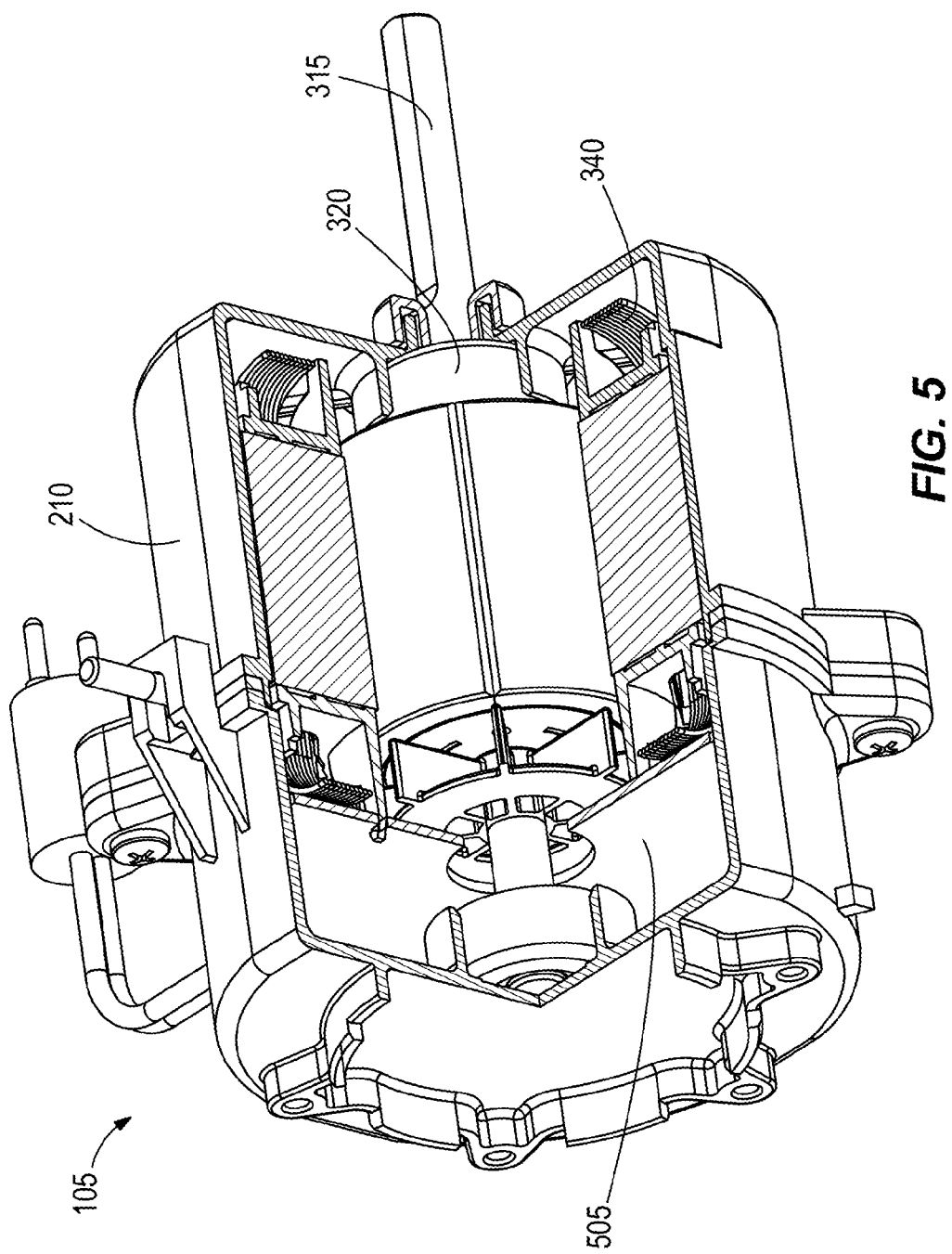
FIG. 5 is a cutaway view of the brushless permanent magnet electrical machine of FIG. 2 that shows a printed circuit board (PCB), which houses an electrical drive circuit that controls and powers the electrical machine.

The stator windings 340 receive electrical current from electronics located on a printed circuit board (PCB) 505. FIG. 5 illustrates a cutaway view of the motor assembly 105 that shows one possible location of the PCB 505. In FIG. 5, the PCB 505 is located at an end of the motor 205 and the shaft 315 passes through the PCB 505. Although FIG. 5 shows the PCB 505 at one end of the motor 205, the PCB 505 can be located at either end of the motor 205. In alternate embodiments, the shaft 315 does not pass through the PCB 505. For example, in alternate embodiments, the PCB 505 is housed inside a casing and attached to the back of the motor 205.

Figure 6:
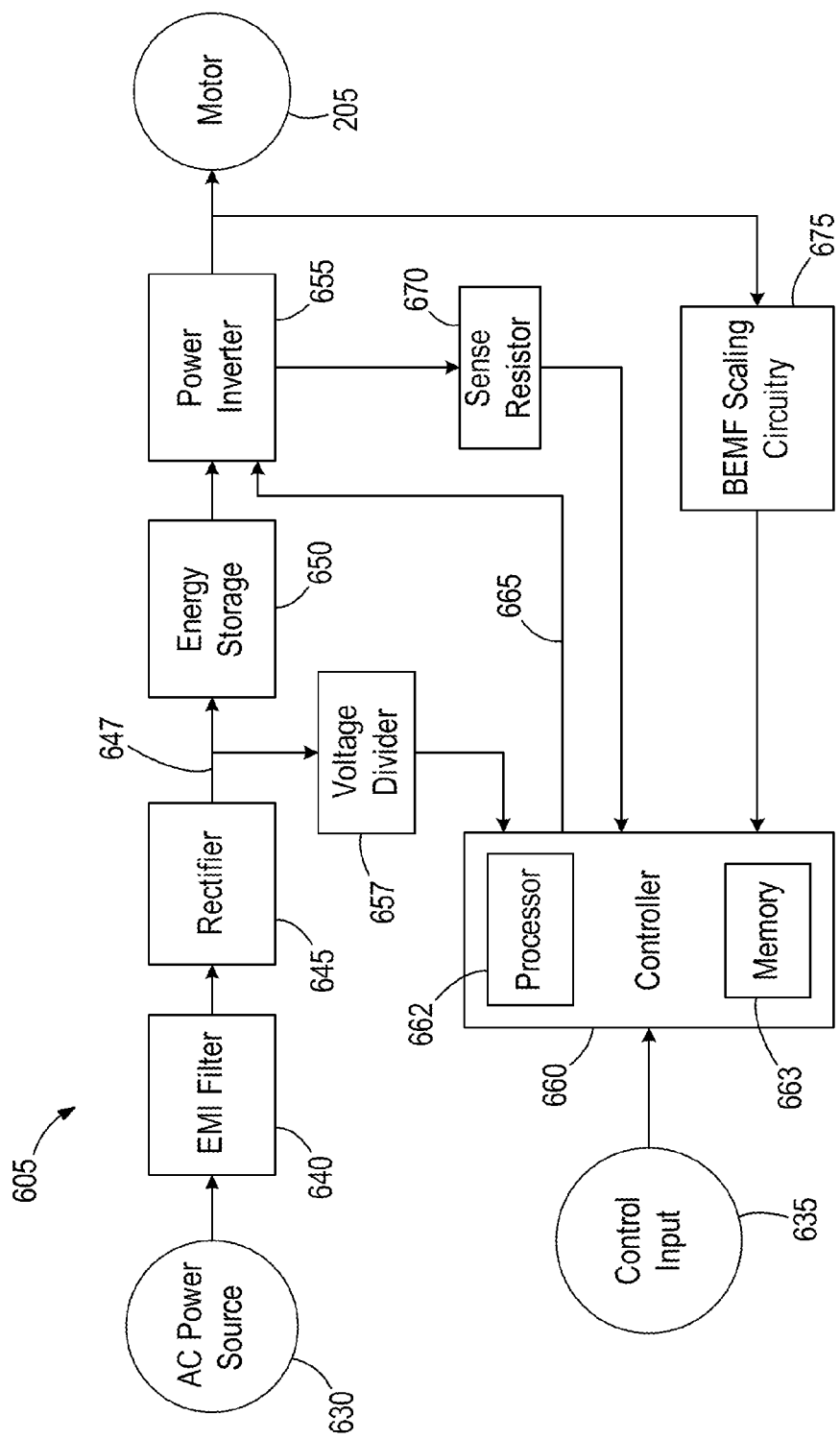
FIG. 6 is a block diagram of the electrical drive circuit for powering the brushless permanent magnet electrical machine of FIG. 2.

FIG. 6 illustrates a block diagram of an electrical drive circuit 605 that receives AC power from a power source 630 and drives the motor 205 in response to a control input 635. The AC power is provided to an electromagnetic interference (EMI) filter 640 and a rectifier 645 that filter and rectify the AC power, resulting in a bus voltage 647. The bus voltage 647 is provided to an energy storage element 650 (e.g., a capacitor), to a power inverter 655, and to a voltage divider 657. The voltage divider 657 reduces the bus voltage 647 to a value capable of being acquired by a controller 660.

The controller 660 includes a processor 662 and a memory 663. Generally speaking, the processor 662 reads, interprets, and executes instructions stored in the memory 663 to control the electrical drive circuit 605. The controller 660, which may be in the form of a microcontroller, can include other components such as a power supply, an analog-to-digital converter, filters, etc. The controller 660 provides drive signals 665 to control the power inverter 655. The power inverter 655 includes power electronic switches (e.g., MOSFETs, IGBTs) to vary the flow of current to the motor 205. For example, the power inverter 655 can be in the form of a bridge circuit. Energy storing devices (e.g., capacitors) of the power inverter 655 are charged prior to providing current to the motor 205 to develop voltages required for switching the power electronic switches.

A sense resistor 670 is used to generate a voltage having a relation to a bus current of the power inverter 655. The voltage of the sense resistor 670 is provided to the controller 660. Other methods of sensing current can be used to sense a current of the motor 205. The controller 660 can receive values associated with phase currents and phase voltages provided by the power inverter 655 along the lines of the sense resistor 670 and BEMF scaling circuitry 675. The BEMF scaling circuitry 675 includes a voltage divider and variable gain amplifiers. The BEMF scaling circuitry 675 provides voltage values to the controller 660. The voltage values provided to the controller 660 by the variable gain amplifiers of the BEMF scaling circuitry 675 have a relation to the BEMF of each phase voltage.

During operation of the refrigeration system 102, the controller 660 can start and control the motor 205 by providing drive signals 665 to the power inverter 655 based on inputs received at the controller 660. The controller 660 can receive input signals from the control input 635 or a serial port interface. In some constructions, the control input 635 can be configured to receive input signals from one or more voltage sensors, current sensors, and auxiliary systems. Voltage sensors and current sensors can be used to measure voltages and currents, respectively, in the motor 205 or other devices operating in cooperation with the motor 205. Thus, the voltage sensors and current sensors can be coupled or placed within the motor 205, or alternatively, these sensors can be placed at a remote location. Moreover, the electrical drive circuit 605 can be coupled or placed within the motor 205, or alternatively in close proximity to the motor 205. Signals generated by auxiliary inputs can be received at the control input 635 and can include signals from safety systems or other input/output devices 106 as schematically illustrated in FIG. 1. In some constructions, no input is provided to the control input 635, and the controller 660 provides drive signals 665 to run the motor 205 at a predetermined speed.

In some constructions of the refrigeration system 102, the thermostat 103, system control board 104, and motor assembly 105 are configured to start and operate the refrigeration system 102 utilizing a set of specific startup methods. For example, the thermostat 103 can generate signals indicative of temperature requirements which can turn on the motor assembly 105. The signals generated by the thermostat 103 can be sent to the system control board 104. In some cases, the system control board 104 can be used to simultaneously control the refrigeration system 102 and other input/output devices 106 such as auxiliary systems or safety devices (e.g. smoke detection systems, alarm systems, ambient humidity control). The system control board 104 can process the signals generated by the thermostat 103 to generate instructions for the motor assembly 105. The motor assembly 105 can receive the instructions from the system control board 104, utilizing a serial port interface, to drive the fan 107 producing generally a constant air flow, for example.

The starting procedure of the motor 205 is stored as software instructions in the memory 663 of the controller 660. The processor 662 of the controller 660 reads the instructions from the memory 663, interprets the instructions, and executes the interpreted instructions resulting in the operation of the motor 205 as described below. Other circuit components (e.g., an ASIC) can be used in place of the processor 662 and the memory 663 to control the motor 205. The software instructions are based on numerous preconfigured values assigned to parameters that will be discussed in greater detail below. The values define ramp functions for an amplitude and frequency of a three-phase AC voltage startup signal that is provided to the motor 205 as a drive signal 665 by the power inverter 655.

Figure 7A:
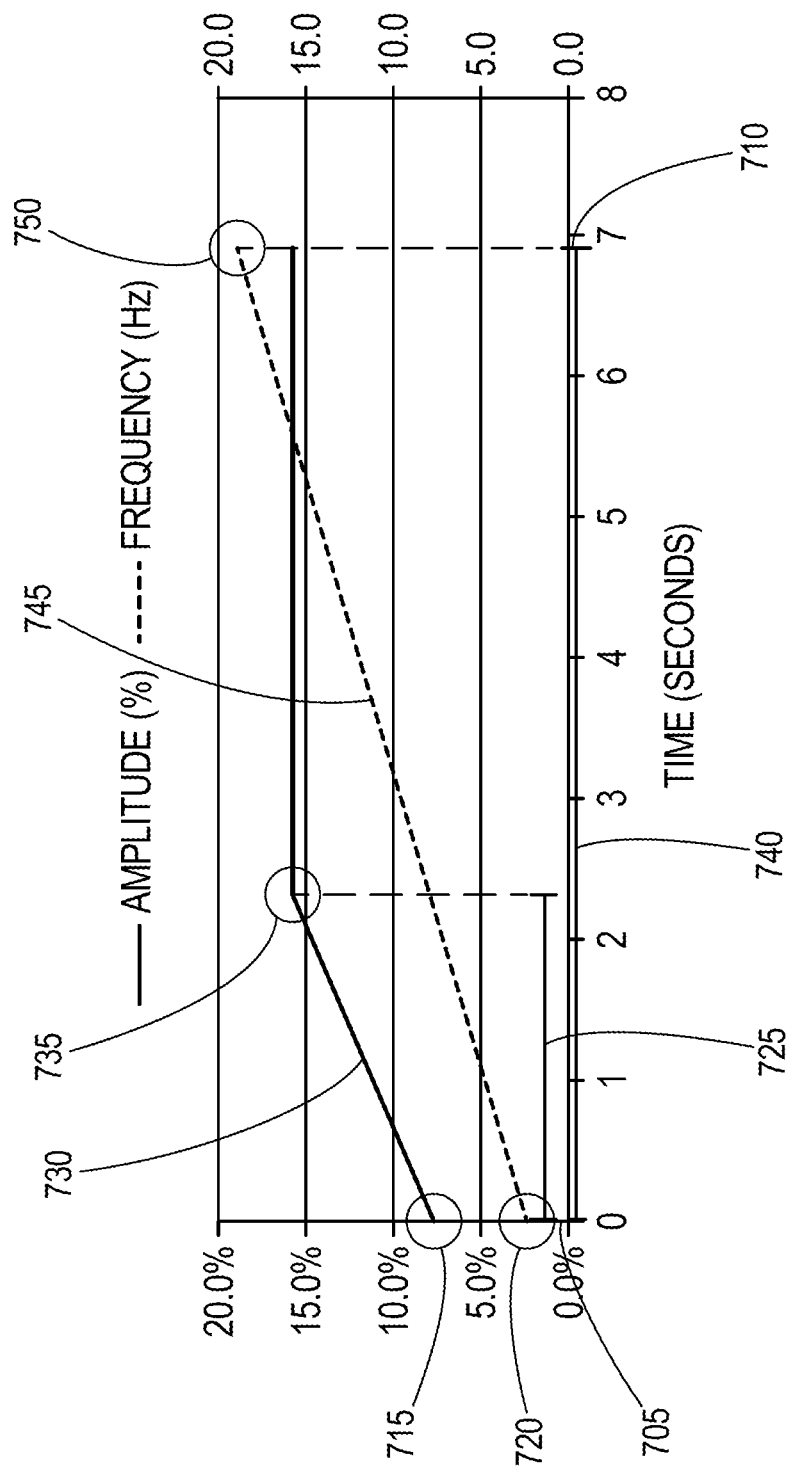
FIGS. 7A and 7B illustrate example graphs of an amplitude and frequency of a three-phase sinusoidal startup signal provided to the electrical machine of FIG. 2 to start commutation of the brushless permanent magnet electrical machine.
Figure 7B:
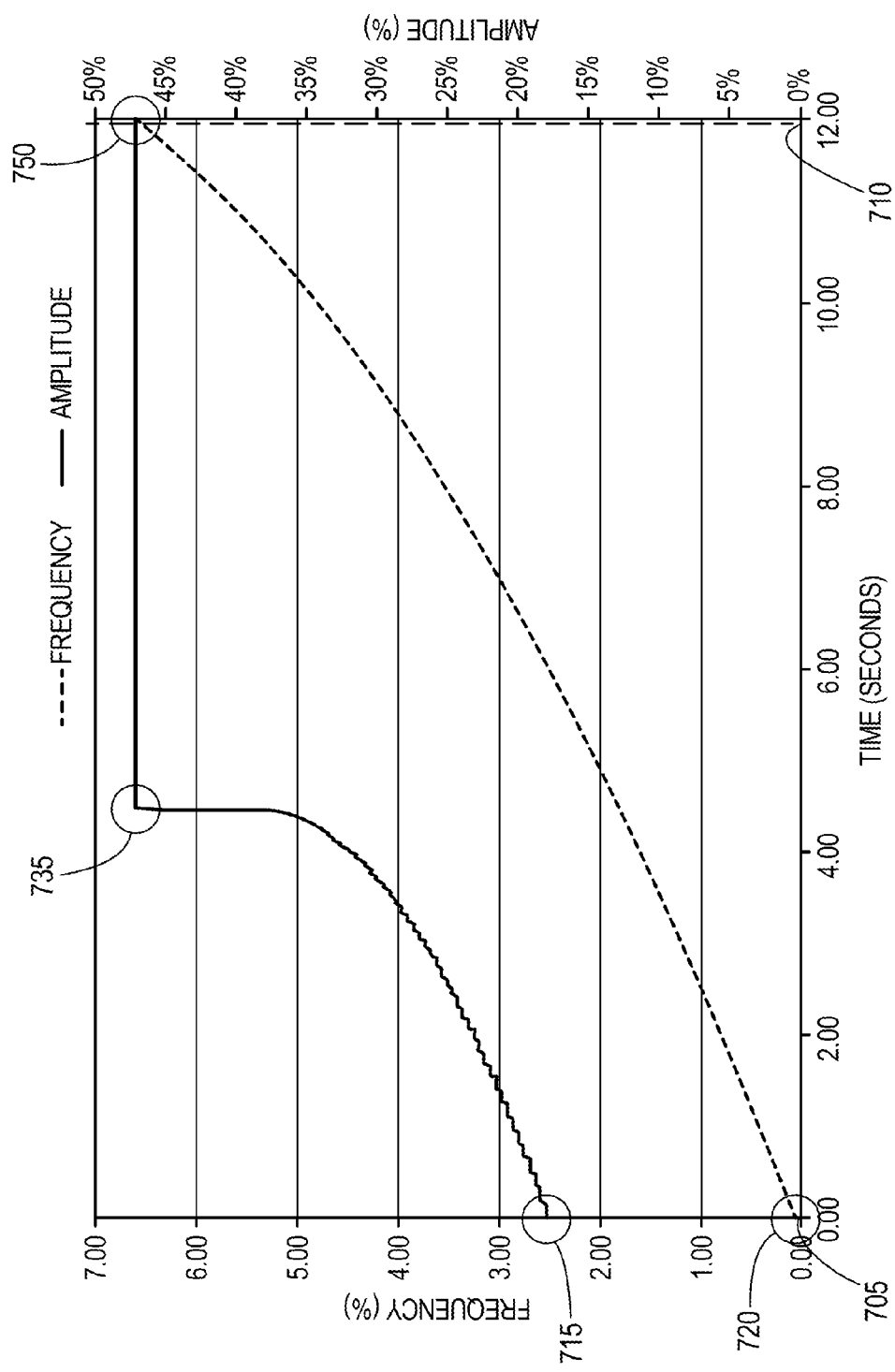

FIGS. 7A and 7B illustrate example graphs of the amplitude and frequency of possible three-phase AC voltage startup signals that can be provided to the motor 205 to start commutation. An amplitude ramp function (illustrated in FIG. 7A by the graph with the higher starting value at a time of zero seconds) controls the amplitude of the startup signal. A frequency ramp function (illustrated in FIG. 7A by the graph with the lower starting value at a time of zero seconds) controls the frequency of the startup signal.

The proposed startup technique uses an open loop drive and, therefore, feedback from the motor is not provided to the controller 660. The startup signal commutates the motor 205 from zero revolutions per minute ("RPM") at startup time 705 to a BEMF switch-over point 710 at which the motor switches over to BEMF control mode (i.e., a closed loop control, receiving feedback). At all points prior to reaching the BEMF switch-over point 710, all three phases of the motor 205 simultaneously generate a three-phase AC voltage according to the amplitude and frequency ramp functions defined by the preconfigured values that are explained in detail below. The three-phase AC voltage may be the same signal except that each is phase shifted one hundred twenty degrees with respect to the other phases.

The ramp functions that control the startup signal include numerous values that are illustrated graphically by FIGS. 7A and 7B. Configurable startup signal values include a starting amplitude 715 and a starting frequency 720. The starting amplitude 715 is the amplitude of the startup signal initially provided to the motor 205 and is represented on the y-axis (left side of the graph) of FIG. 7A by the percentage of applied voltage to the motor 205. The applied voltage results in some current flow, which provides a magnetic field that allows the motor 205 to begin to commutate. The starting frequency 720 is the frequency of the startup signal initially provided to the motor 205 and has units of Hertz (Hz) as shown on the y-axis (right side of the graph).

Startup signal values further include an amplitude ramp-up time 725, an amplitude increase count 730, and a maximum amplitude 735. During amplitude ramp-up time 725, the amplitude of the startup signal increases according to amplitude increase count 730 until the amplitude of the startup signal reaches maximum amplitude 735. The frequency of the startup signal is defined by similar values. During frequency ramp-up time 740, the frequency of the startup signal increases according to frequency increase count 745 until the frequency reaches maximum frequency 750. The amplitude increase count 730 and frequency increase count 745 represent the value of the slope of the amplitude and frequency graphs, respectively, during ramp-up times 725 and 740. When both amplitude and frequency have reached their respective maximums, the motor 205 switches over to BEMF control mode at BEMF switch-over point 710.

In FIGS. 7A and 7B, the amplitude of the startup signal reaches its maximum before the frequency reaches its maximum. Once the amplitude of the startup signal reaches its maximum amplitude 735, the amplitude ramp function is complete. Thus, the amplitude will remain constant, as indicated by the horizontal line of the amplitude graph from about 2.4 seconds until 7 seconds. The amplitude of the startup signal remains constant until the frequency reaches the maximum frequency 750 at the BEMF switch-over point 710. Although the amplitude ramp function reaches its maximum value before the frequency ramp function in FIGS. 7A and 7B, in some embodiments the frequency ramp function reaches its maximum value before the amplitude ramp function. Accordingly, the BEMF switch-over point 710 is the point at which both the amplitude and the frequency of the startup signal have reached their respective maximum values.

Multiple variations of the ramp functions are possible. As shown in FIG. 7B, in some embodiments, the ramp function for the amplitude, frequency, or both is exponential (i.e., curved) rather than linear as shown in FIG. 7A. In such embodiments, an additional value (i.e., acceleration) can be used to control the slope of the ramp function for amplitude, frequency, or both. Furthermore, in some embodiments, the amplitude and frequency of the startup signal can reach their respective maximums at the same time. In alternate embodiments, the amplitude of the startup signal remains constant (i.e., amplitude increase 730 is set to zero) during amplitude ramp-up time 725. Thus, the BEMF switch-over point 710 occurs after the frequency ramp function has completed. In such embodiments, the amplitude value is set high enough to generate torque at all speeds.

Values of the ramp functions are configurable and can be adjusted such that the startup technique can be used for a wide variety of motors. The values of the ramp functions are determined primarily through experimentation. However, general guidelines for setting the values do exist. For example, larger motors will likely have longer ramp-up times and smaller amplitude increase values than smaller motors. Details of determining and configuring the startup signal values are explained below.

The ramp functions take advantage of known characteristics of BLDC motors to start the motor 205 smoothly and switch over to BEMF control mode. For BLDC motors, when the angle between the magnetic fields of the stator 305 and rotor 310 is 90 degrees, the efficiency and torque of the motor 205 are maximized. Additionally, the torque of the motor 205 is directly proportional to the magnitude of the current input to the motor 205 and to the angle between the magnetic fields of the stator 305 and rotor 310.

If just enough current is provided to the motor 205, the motor 205 rotates at maximum efficiency with a 90 degree angle between the magnetic fields of the stator 305 and rotor 310. However, when operating at this maximum efficiency and 90 degree magnetic field angle, changes to the load of the motor 205 significantly affect commutation. Similarly, the torque of the motor 205 is very sensitive to changes in input as well. Accordingly, specific knowledge about characteristics of the load is used to provide the proper amount of input current to the motor 205 and achieve an angle of 90 degrees between the magnetic fields of the stator 305 and rotor 310.

However, in some motor applications, the load of the motor 205 is not specifically known. In such applications, known characteristics of BLDC motors can be used to start the motor 205 without specific knowledge about the load. As discussed above, the motor 205 is at maximum efficiency when the angle between the magnetic fields of the stator 305 and rotor 310 is 90 degrees. As additional current beyond this maximum efficiency point is applied to the motor 205, the motor 205 becomes less efficient by decreasing the angle between the magnetic fields of the stator 305 and rotor 310. The decreased angle decreases the power to the motor 205 while maintaining approximately the same torque. Thus, the more current provided to the motor 205, the smaller the angle between magnetic fields of the stator 305 and rotor 310 becomes.

Furthermore, with high input current and small angles between the magnetic fields of the stator 305 and rotor 310, the torque of the motor 205 is less sensitive to changes in load or input current because the sine function input to the motor 205 is steep (i.e., the value of the slope is high). Thus, variations in input current do not affect the location of the rotor 310 at high currents and small angles (i.e., currents and angles causing the motor to run less efficiently) as much as the same variations would affect the location of the rotor 310 at lower currents and higher angles (i.e., currents and angles near maximum efficiency).

Accordingly, the position of the rotor 310 can be estimated within a relatively high degree of certainty. Stated another way, if the ramp functions controlling the startup signal provide enough current to the motor 205 to decrease the angle between the two magnetic fields to a small value (i.e., under 25 degrees), the position of the rotor 310 relative to the provided startup signal is known within ±20-25 degrees. Furthermore, switching to BEMF motor control under this angle assumption will minimally affect the torque of the motor 205, which allows for a smooth transition from the open loop startup signal to BEMF control mode (i.e., a closed loop control, receiving feedback). Accordingly, the motor 205 can switch to directly to BEMF control mode without coasting to find the position of the rotor 310. In the BEMF control mode, the electrical drive circuit 605 can then estimate the rotor position through sensorless control.

If the values of the startup signal are properly configured by using experimentation and characteristics of the motor 205, the position of the rotor 310 is known within a small range of angles. In particular, the rotor 310 is known to be lagging behind the startup signal by a certain amount. Thus, the motor does not need to coast to find the rotor before switching to BEMF control mode because the position of the rotor is known with an adequately high degree of certainty (i.e., within ±20-25 degrees of actual position).

Figure 8:
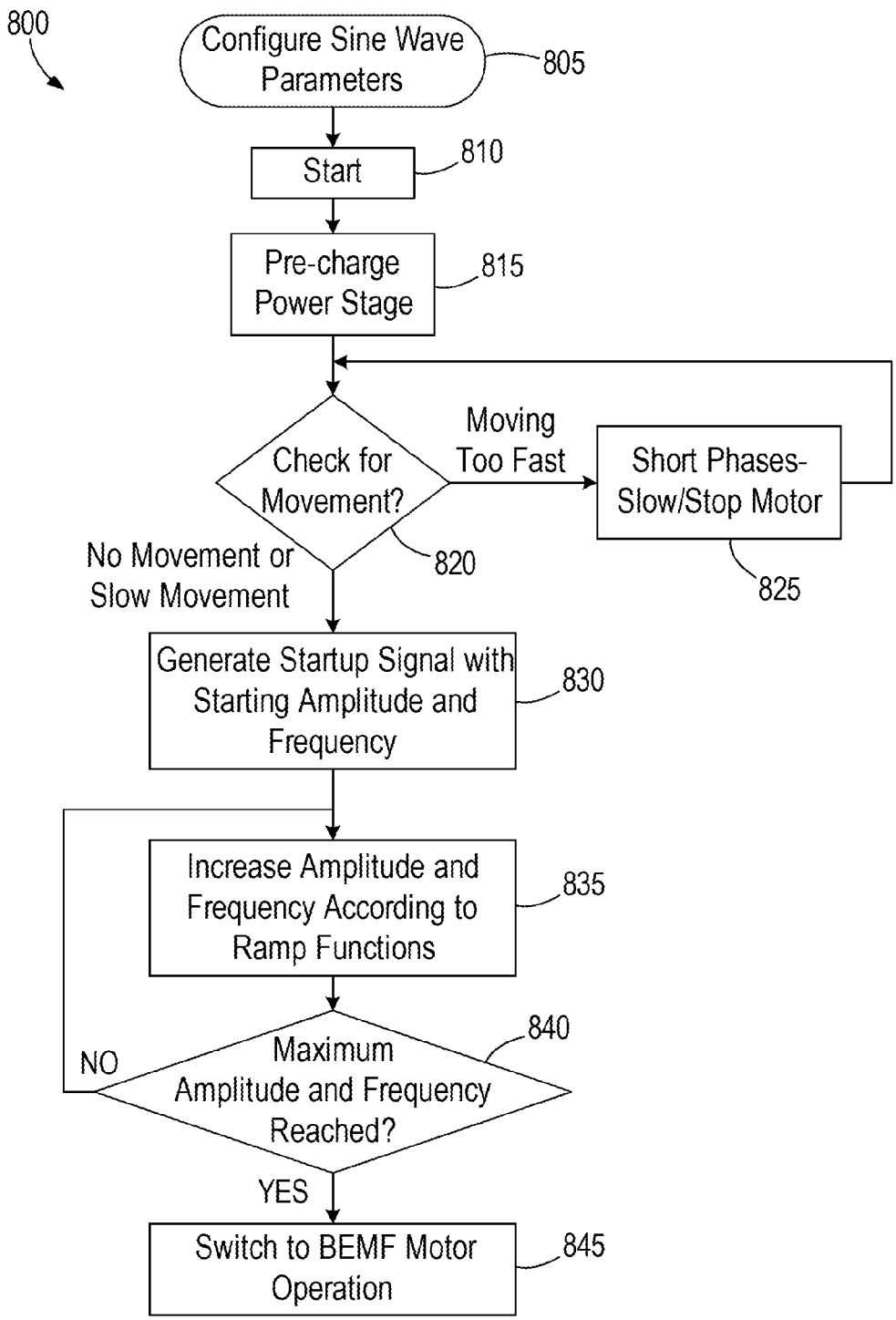
FIG. 8 is flow diagram of a start routine of the brushless permanent magnet electrical machine of FIG. 2.

FIG. 8 illustrates a flow chart describing one possible process 800 for starting the brushless permanent magnet electrical motor 205 utilizing the electrical drive circuit 605. As previously explained, before beginning the motor start-up process 800, the values of the startup signal used to start the motor 205 are configured at block 805 after being experimentally determined. After configuring the values of the startup signal, the process 800 can be started (at block 810). A pre-charge power stage takes place at block 815. The pre-charge power stage can include charging energy storing devices (e.g., capacitors) that are used to develop voltages required for switching the power electronic switches (e.g., IGBTs) of the power inverter 655 on. Various methods for charging the capacitors can be used.

Occasionally, the rotor 310 is in motion when the method for starting the motor 205 is initiated. The controller 660 monitors the BEMF to detect movement of the rotor 310 (at block 820). The variable gain amplifiers are switched to a high gain mode to detect possible low BEMF signals produced by the motor 205. Low BEMF signals are generally indicative of significantly slow motion of the rotor 310. The controller 660 usually determines the rotational speed of the rotor 310 by measuring the time between BEMF crossings. For example, if the time between BEMF crossings increases, it is determined that the rotor 310 is slowing down. Before sending the startup signal to the motor 205 and beginning the ramp functions, the rotor 310 is monitored to ensure that it is stopped or moving at a slow enough speed such that the startup signal will commutate the motor 205 as expected. If the speed of the rotor 310 is too high, the rotor 310 is slowed down or stopped by shorting some or all phases of the motor 205 (at block 825).

The controller 660 classifies the speed of the rotor 310 under the no movement or slow movement state when there is relatively no rotation of the rotor 310. In such case, the controller 660 starts and ramps up the motor 205 according to the preconfigured values of the amplitude and frequency ramp functions of the startup signal (at block 830). As discussed above, the preprogrammed, open-loop startup signal is ramped up according to the amplitude and frequency ramp functions based on configurable values. The startup signal commutates the motor 205 from zero RPM to a certain speed based on the ramp functions until the motor 205 reaches the BEMF switch-over point 810.

For quiet and smooth operation of the motor 205, it is best to produce a sine wave current during ramp up of the motor (at block 830). However, the controller 660 controls the voltage signal (rather than directly controlling current input) provided to the motor 205 by the power inverter 655. By controlling the voltage signal, the controller 660 indirectly controls the current provided to the motor (i.e., a sine wave voltage produces a trapezoidal current). The voltage signal can be intentionally distorted to produce a current that more closely resembles a sine wave. Accordingly, the current provided to the motor 205 is more sinusoidal and the motor 205 rotates more smoothly.

At block 835, the controller 660 increases the amplitude and frequency of the startup signal according to the ramp functions based on preconfigured values discussed above. At block 840, the controller 660 checks if the both the amplitude and frequency ramp functions are complete. If the one or both of the ramp functions are not complete, the controller 660 continues to instruct the power inverter 655 to provide the open-loop startup signal to the motor 205 according to the ramp functions (at block 835). When both ramp functions are complete, the motor 205 has reached the BEMF switch-over point 810, and the controller 660 switches to BEMF control mode (at block 845). Monitoring the BEMF allows the controller 660 to determine a period in relation to the rotational speed of the rotor 310.

Various features and advantages of the invention are set forth in the following claims.

What is claimed is:

1. A method of controlling an electrical machine including a stator having a core and a plurality of windings, and a rotor disposed adjacent to the stator to interact with the stator, the method comprising:
configuring an amplitude value and frequency values of a three-phase alternating current (AC) voltage startup signal having an amplitude and a frequency, the three-phase (AC) voltage startup signal being distorted from a sinusoidal voltage;
providing the three-phase AC voltage startup signal to the plurality of windings resulting in a substantially sinusoidal current;
altering the frequency of the three-phase AC voltage startup signal according to a frequency ramp function defined by the frequency values, wherein the three-phase AC voltage startup signal provides an open loop ramp up of the electrical machine;
discontinuing the three-phase AC voltage startup signal when the frequency ramp function has completed;
switching to a back electromotive force (BEMF) control mode, when discontinuing the three-phase AC voltage startup signal, by using a known estimated position of the rotor based on the frequency ramp function.

2. The method of claim 1, wherein the configuring an amplitude value and frequency values includes configuring amplitude values of the three-phase AC startup signal, and wherein the method further comprises altering the amplitude of the three-phase AC voltage startup signal according to an amplitude ramp function defined by the amplitude values, wherein discontinuing the three-phase AC voltage startup signal occurs after the amplitude ramp function has completed.

3. The method of claim 2, wherein the altering the amplitude, the altering the frequency, or both includes linearly increasing the amplitude, the frequency, or both of the three-phase AC voltage startup signal.

4. The method of claim 2, wherein the altering the amplitude, the altering the frequency, or both includes exponentially increasing the amplitude, the frequency, or both of the three-phase AC voltage startup signal.

5. The method of claim 1, further comprising detecting a movement of the rotor prior to providing the three-phase AC voltage startup signal to the plurality of windings.

6. The method of claim 5, wherein detecting movement of the rotor further includes detecting a rotational speed of the rotor.

7. The method of claim 1, wherein switching to the BEMF control mode occurs instantaneously when discontinuing the three-phase AC voltage startup signal.

8. The method of claim 1, further comprising preventing the rotor from coasting during execution of the method.

9. The method of claim 1, wherein altering the frequency includes linearly increasing the frequency of the three-phase AC voltage startup signal.

10. The method of claim 1, wherein altering the frequency includes exponentially increasing the frequency of the three-phase AC voltage startup signal.

11. An electrical machine comprising:
a stator having a core and a plurality of windings;
a rotor disposed adjacent to the stator to interact with the stator;
a memory; and
a controller arranged to start the electrical machine, the controller configured to
obtain a preprogrammed amplitude value and preprogrammed frequency values of a three-phase alternating current (AC) voltage startup signal having an amplitude and a frequency, the three-phase (AC) voltage startup signal being distorted from a sinusoidal voltage,
generate the three-phase AC voltage startup signal to be provided to the plurality of windings resulting in a substantially sinusoidal current,
alter the frequency of the three-phase AC voltage startup signal according to a frequency ramp function defined by the frequency values, wherein the three-phase AC voltage startup signal provides an open loop ramp up of the electrical machine,
discontinue the three-phase AC voltage startup signal when the frequency ramp function has completed, and switch to a back electromotive force (BEMF) control mode, using a known estimated position of the rotor based on the frequency ramp function, when the three-phase AC voltage startup signal is discontinued.

12. The electrical machine of claim 11, wherein the controller is further configured to
    alter the amplitude of the three-phase AC voltage startup signal according to an amplitude ramp function defined by a plurality of amplitude values, and
    discontinue the three-phase AC voltage startup signal after when the amplitude ramp function has completed.

13. The electrical machine of claim 12, wherein at least one of the amplitude ramp function and the frequency ramp function linearly increases in value.

14. The electrical machine of claim 12, wherein at least one of the amplitude ramp function and the frequency ramp function exponentially increases in value.

15. The electrical machine of claim 11, wherein the controller is further configured to detect a movement of the rotor before the controller generates the three-phase AC voltage startup signal.

16. The electrical machine of claim 11, wherein the BEMF control mode is a closed loop control mode that receives feedback for the BEMF produced by the electrical machine.

17. The electrical machine of claim 11, wherein the electrical machine includes a permanent magnet, brushless direct current motor.

18. The electrical machine of claim 11, wherein the frequency ramp function linearly increases in value.

19. The electrical machine of claim 11, wherein the frequency ramp function exponentially increases in value.

20. An air movement system comprising:
    a system control board;
    a motor assembly including
        a stator having a core and a plurality of windings, and
        a rotor disposed adjacent to the stator to interact with the stator,
    a drive circuit coupled to the motor assembly and having a controller and a memory, the controller being configured to start the motor assembly and receive a preprogrammed amplitude value and preprogrammed frequency values of a three-phase alternating current (AC) voltage startup signal having an amplitude and a frequency, the three-phase (AC) voltage startup signal being distorted from a sinusoidal voltage, wherein the controller starts the motor assembly by being further configured to
    provide the three-phase AC voltage startup signal to the plurality of windings resulting in a substantially sinusoidal current;
    alter the frequency of the three-phase AC voltage startup signal according to a frequency ramp function defined by the frequency values, wherein the three-phase AC voltage startup signal provides an open loop ramp up of the electrical machine;
    discontinue the three-phase AC voltage startup signal when the frequency ramp function has completed;
    switch to a back electromotive force (BEMF) control mode, when discontinuing the three-phase AC voltage startup signal, by using a known estimated position of the rotor based on the frequency ramp function.

21. The air movement system of claim 20, wherein the controller is further configured to
    alter the amplitude of the three-phase AC voltage startup signal according to an amplitude ramp function defined by a plurality of amplitude values, and
    discontinue the three-phase AC voltage startup signal after the amplitude ramp function has completed.

22. The air movement system of claim 20, wherein the controller is further configured to detect a movement of the rotor before the controller provides the three-phase AC voltage startup signal to the plurality of windings.

23. The air movement system of claim 20, wherein the air movement system further includes a thermostat.

* * * * *